(12) United States Patent
Crisp (10) Patent No.: US 10,202,566 B2
(45) Date of Patent: Feb. 12, 2019

(54) DEGRADABLE SUBSTANCE PRESERVATION DEVICE

(71) Applicant: Alan Crisp, Newport, OR (US)

(72) Inventor: Alan Crisp, Newport, OR (US)

(*) Notice: Subject to any disclaimer, the term of this patent is extended or adjusted under 35 U.S.C. 154(b) by 426 days.

(21) Appl. No.: 14/526,253

(22) Filed: Oct. 28, 2014

(65) Prior Publication Data

US 2017/0129631 A1    May 11, 2017

(51) Int. Cl.
| C12H 1/16 | (2006.01) |
| B65D 81/20 | (2006.01) |
| B65D 39/00 | (2006.01) |
| B65D 51/24 | (2006.01) |
| C12H 1/14 | (2006.01) |

(52) U.S. Cl.
CPC .......... C12H 1/16 (2013.01); B65D 39/0076 (2013.01); B65D 51/244 (2013.01); B65D 81/2038 (2013.01); C12H 1/14 (2013.01)

(58) Field of Classification Search
CPC .............. B65D 51/244; B65D 81/2038; B65D 39/0076; B65D 41/04; C12H 1/16; C12H 1/061
USPC ....................................................... 215/228
See application file for complete search history.

(56) References Cited

U.S. PATENT DOCUMENTS

| 4,998,633 | A | 3/1991 | Schneider |
| 5,535,900 | A | 6/1995 | Huang |
| 6,183,827 | B1* | 2/2001 | Folchini ................. B65D 41/12 215/230 |
| 6,886,605 | B2 | 5/2005 | Luis |
| 7,413,083 | B2* | 8/2008 | Belfance .............. B65D 43/162 206/204 |
| 8,151,985 | B2* | 4/2012 | Owoc .................... B65D 25/08 206/219 |
| 8,794,487 | B2* | 8/2014 | Maas .................... B65D 25/14 156/242 |
| 2013/0126369 | A1* | 5/2013 | Gamelli .............. B65D 47/122 206/217 |
| 2014/0263453 | A1 | 9/2014 | Haley et al. |

* cited by examiner

*Primary Examiner* — Anthony Stashick
*Assistant Examiner* — Raven Collins
(74) *Attorney, Agent, or Firm* — Stewart Myers (57) ABSTRACT

A device for the preservation of degradable substances (e.g. degradable by oxidation) such as liquids or powders, especially edible substances, beverages (e.g. wine), or foods (e.g. coffee) as well as oils, tobacco, pharmaceuticals, colorants or paints in an opened container, e.g. a bottle, exposed to the oxygen of the air is provided herein. Aspects of the invention include an apparatus for removing oxygen from an opened container or bottle by coupling the container or bottle to a shell that contains an oxygen absorbent material such as reduced iron.

13 Claims, 14 Drawing Sheets

DEGRADABLE SUBSTANCE PRESERVATION DEVICE

CROSS-REFERENCES TO RELATED APPLICATIONS

This application claims priority to U.S. Provisional Patent Application Ser. No. 61/896,502 filed on Oct. 28, 2013 entitled "Preservation System", the disclosure of which is hereby incorporated by reference.

FIELD OF THE INVENTION

The present invention relates to preservation devices, and more specifically, devices which remove atmospheric oxygen from a sealed container.

BACKGROUND OF THE INVENTION

Oxygen has a long-standing reputation for being not only a necessary element in daily life, but also a chemical menace. The earliest forms of life on earth were anaerobic, and would be severely damaged or die from oxygen exposure. Once the atmosphere became dominated by oxygen, some anaerobic organisms evolved into a symbiotic role and eventually became the mitochondria found in cells today. Most terrestrial organisms require oxygen to survive; this includes the yeasts and fungi which can cause edibles to go bad. Oxygen is also burdensome for stored acrylic paints, as the oils within the mixture oxidize to form the plastic-like bonds of dried paint.

The preservation of perishable items is known within the art. The most basic of devices see a plug made of plastic or cork to effectively trap oxygen outside of the container. Although simplistic in design and economically feasible, these devices also trap any remaining oxygen within the container, which can allow for bacterial or fungal growth.

Oxygen removal from containers is known within the art. One such method sees a vacuum system used to remove as much atmospheric gas as possible from the container. This is accomplished by creating a vacuum in a chamber within the unit, and transferring that vacuum to the storage container. Once the vacuum has removed as much of the atmospheric gas as the pump can, the user then actuates an integral valve in the container, sealing the container, and preventing any air from entering.

Unfortunately, this vacuum system can be cumbersome to use, as it sees a pumping apparatus, which generally requires a power source. If a power source is readily available, the system is generally noisy when operating, and vacuum tubes can be severed, rendering the pumping system useless. Another disadvantage of this system lies within the storage containers as they tend to be proprietary to the maker, making it difficult to obtain additional containers, or repair broken parts. Furthermore, some stored items cannot be placed under a vacuum without deforming or otherwise altering the properties of the item.

Another method sees noble gas pumped into the container as a replacement for oxygen. Generally, noble gasses do not react with other elements, as they are chemically stable in their elemental form. Unfortunately, this method can be costly and difficult to perform on a consumer level. The method requires the user to keep noble gasses in house, and to purchase an apparatus which can both remove oxygen, and add gas to the container. Containers for these apparatus tend to be proprietary and hard to find.

Another method employs oxygen-absorption material placed inside porous-walled bags, which are then inserted into the desired containers. There are many commercially-available, food-rated oxygen absorption materials such as iron-based materials or salts. Unfortunately, oxidation readily occurs in conditions found within a home environment. Containers containing oxygen absorbent materials should not be used with liquid, as the materials used in the containers can allow liquid to penetrate the oxygen absorbent material, rendering it inactive. Furthermore, any contact with the oxygen absorbent material can contaminate liquids or other degradable substances that are being preserved by the oxygen absorbent materials. For example, salt-based oxygen absorbent materials could readily dissolve into liquid resulting in contamination should contact occur.

It could be said there lies a need for a method of removing atmospheric oxygen from a container without the use of proprietary vacuums or noble gasses.

The present invention meets this need by providing the user with a stopper-type device which houses replaceable oxygen-absorption material and shields that material from contact with liquids and other preferably-untouched material.

BRIEF SUMMARY OF THE INVENTION

The present invention relates to the preservation of degradable substances (e.g. degradable by oxidation) such as liquids or powders, especially edible substances, beverages (e.g. wine), or foods (e.g. coffee) as well as oils, tobacco, pharmaceuticals, colorants or paints in an opened container, e.g. a bottle, exposed to the oxygen of the air.

In one embodiment of the present invention, a device containing an oxygen absorbent material suitable for significantly lowering the content of oxygen in a container or bottle, therefore preserving the degradable substances, such as a beverage, e.g. wine, within the container or bottle, is provided.

In another embodiment of the present invention, a stopper intended to be inserted into the end of a container or bottle for use with the device of the first aspect, or independently of the first aspect if no oxygen absorbent material is contained within the invention is provided.

In yet another embodiment of the prevention, a method for preserving a degradable substance, such as a liquid or powder, especially beverages such as wine in a previously opened bottle or a food powder, such as coffee in a previously opened container by removing oxygen from the bottle or container is provided.

Other novel features which are characteristics of the invention, as to organization and method of operation, together with further and advantages thereof will be better understood from the following description considered in connection with the accompanying figures, in which preferred embodiments of the invention are illustrated by way of example. It is to be expressly understood, however, that the figures are for illustration and description only and are not intended as a definition of the limits of the invention. The various features of novelty which characterize the invention are pointed out with particularity in the following description. The invention resides not in any one of these features taken alone, but rather in the particular combination of all of its structures for the functions specified.

A further understanding of the present invention can be obtained by reference to a preferred embodiment set forth in the accompanying description. Although the illustrated embodiments are merely exemplary of methods for carrying out the present invention, both the organization and method of operation of the invention, in general, together with further objectives and advantages thereof, may be more easily understood by reference to the illustrations and the following description. The figures are not intended to limit the scope of this invention, but merely to clarify and exemplify the invention.

DETAILED DESCRIPTION OF THE INVENTION

In the following detailed description, reference is made to specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense.

The word "exemplary" is used hereinto mean "serving as an example, instance, or illustration." Any embodiment described herein as "exemplary" is not necessarily to be construed as preferred or advantageous over other embodiments. Likewise, the terms "embodiment(s) of the invention", "alternative embodiment(s)", and "exemplary embodiment(s)" do not require that all embodiments of the method, system, and apparatus include the discussed feature, advantage or mode of operation. The following description of the preferred embodiment is merely exemplary in nature and is in no way intended to limit the invention, its application, or use.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter. Those skilled in the art will appreciate that the conception upon which this disclosure is based may be readily utilized as a basis for the designing of other structures, methods and systems for carrying out the purposes of the present invention. It is important, therefore, that any embodiments of the present invention be regarded as including such equivalent constructions insofar as they do not depart from the spirit and scope of the present invention.

Further, the purpose of the Abstract herein is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application nor is it intended to be limiting as to the scope of the invention in any way.

Referring now to the present invention, there is introduced a degradable substance preservation device that preserves degradable substances by removing oxygen from the substance's container. For the purpose of clarity, all like elements mentioned in this description, or illustrated in the accompanying Figures, will have the same designations. The terms "degradable substance preservation device", "preservation device", "device", "assembly", "present invention", and "invention" may be used interchangeably. In addition to the functions, features, components, and abilities of the invention already discussed in this specification, the invention may also have, but not be limited to, the following features contained within the description below.

The present invention solves the shortcomings of the prior art by providing a degradable substance preservation device that reduces the detrimental effects of oxidation on degradable or perishable substances. These degradable substances can include, but are not limited to, beverages such as wine, foods, coffees, oils, tobacco, pharmaceuticals, colorants, or paints. The preservation system is intended to be inserted into an opening of the substance's container. Upon exposure to the air within the container an oxygen absorbent material in the preservation system removes an amount of oxygen from the air in the container. The preferred embodiments described below set forth the present invention in greater detail.

Figure 1:
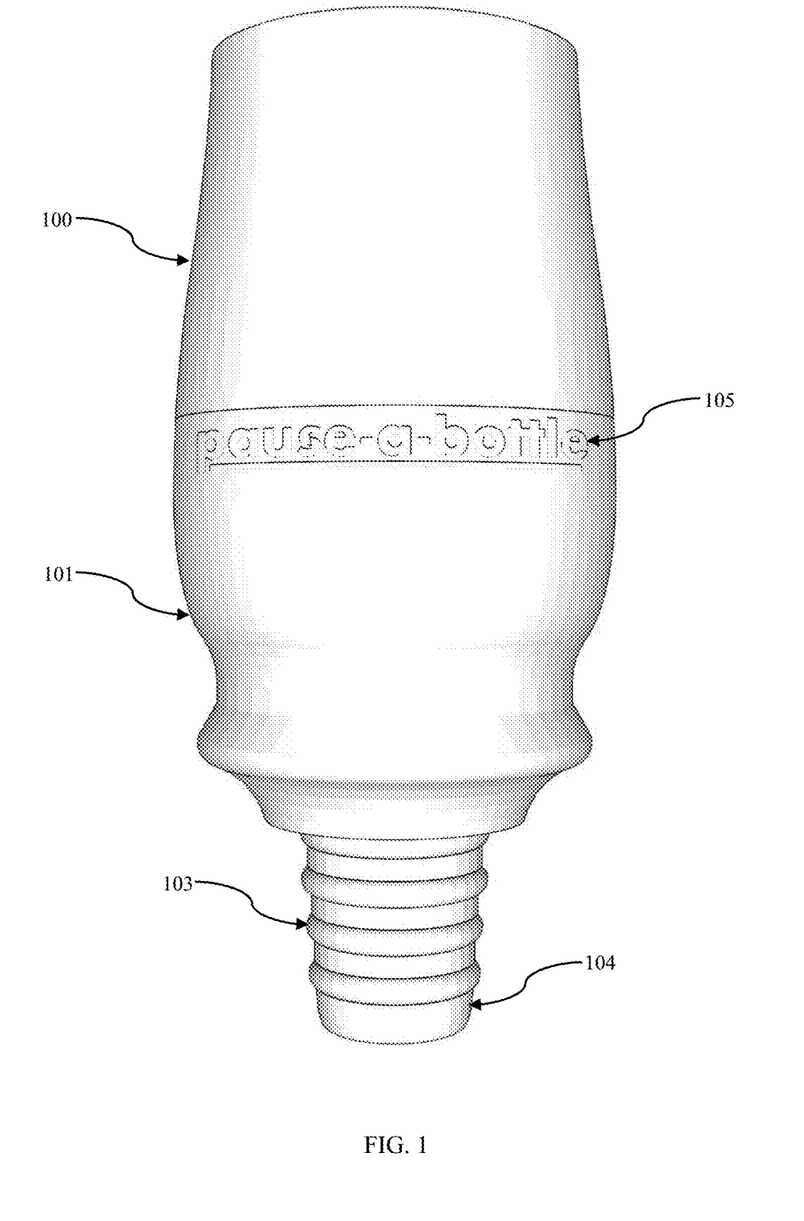
FIG. 1 shows a front view of a complete assembly of a degradable substance preservation device as according to one embodiment of the present invention.
Figure 2:
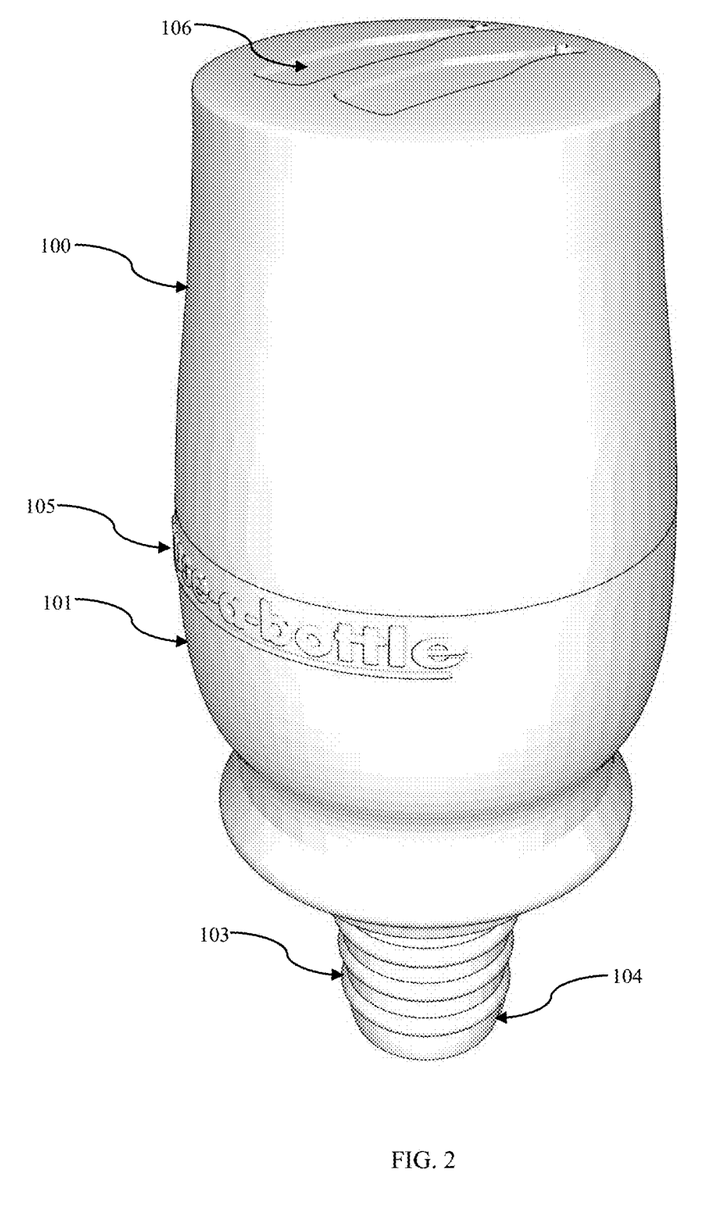
FIG. 2 shows an elevated isometric view of a complete assembly of a degradable substance preservation device as according to one embodiment of the present invention.
Figure 3:
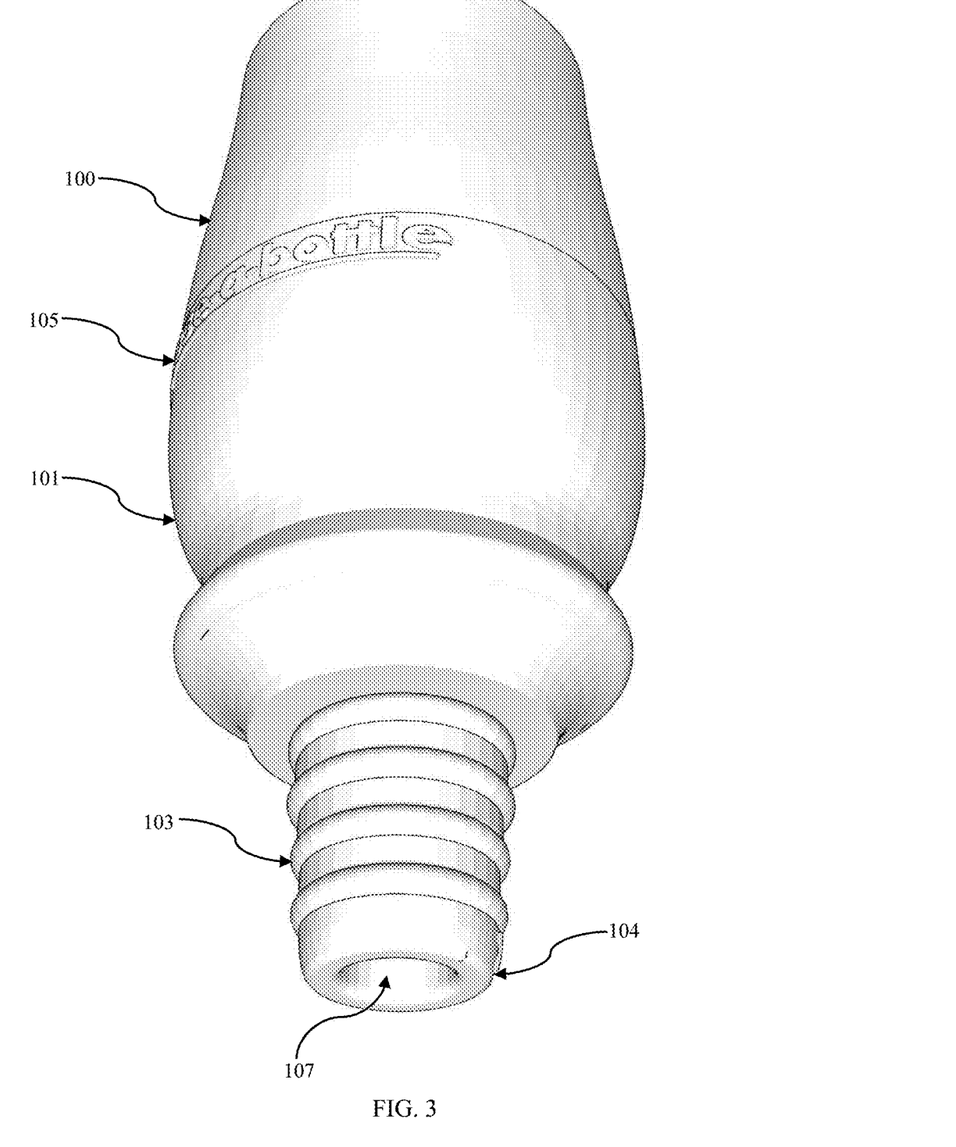
FIG. 3 shows a lower isometric view of a complete assembly of a degradable substance preservation device as according to one embodiment of the present invention.
Figure 4:
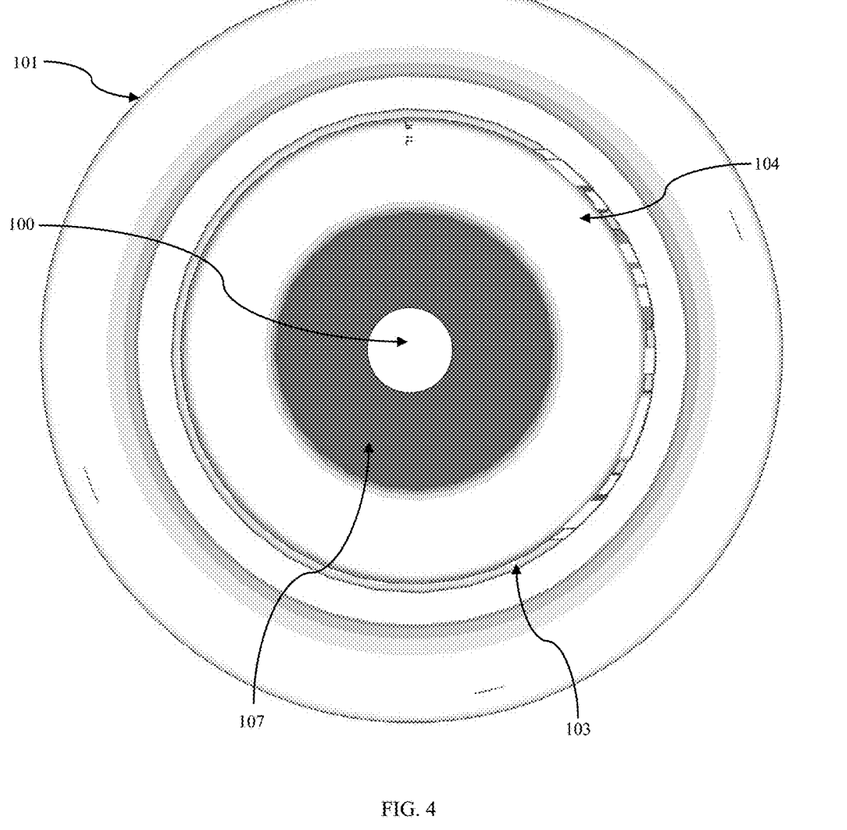
FIG. 4 shows a shows a bottom view of a complete assembly of a degradable substance preservation device as according to one embodiment of the present invention.
Figure 5:
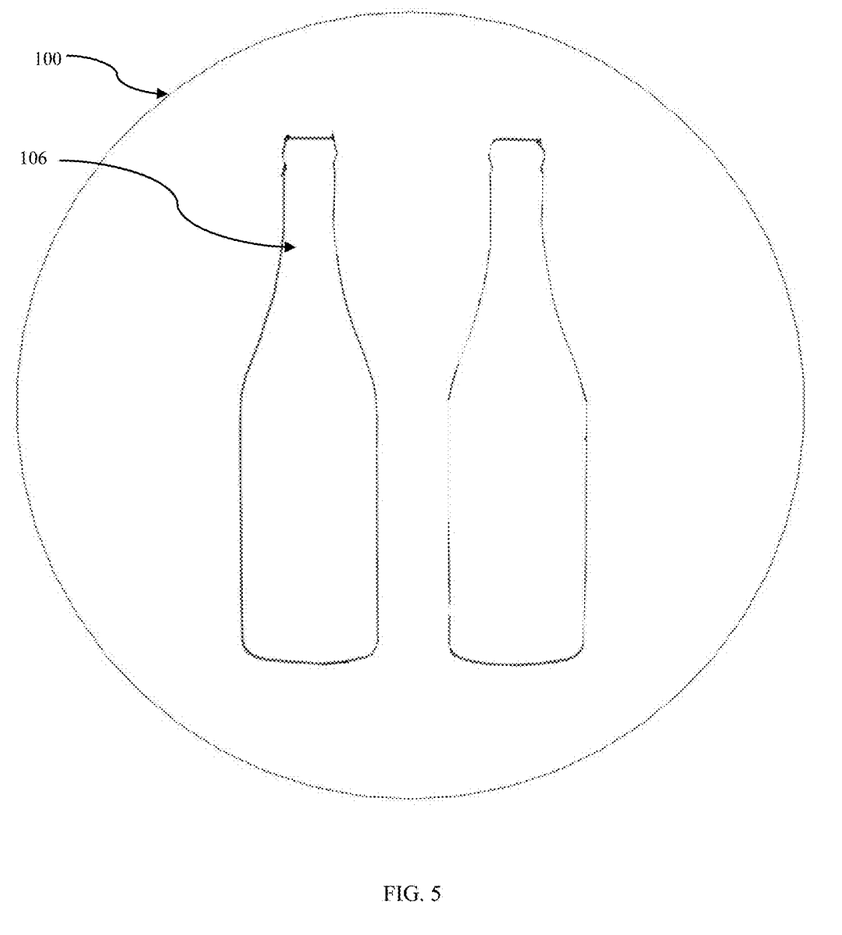
FIG. 5 shows a shows a top view of a complete assembly of a degradable substance preservation device as according to one embodiment of the present invention.

Referring now to FIGS. 1-5 that will be discussed together, there are shown views of a complete assembly of a degradable substance preservation device as according to one embodiment of the present invention. This embodiment of the present invention consists of a two-piece shell enclosure comprising an upper shell component (100) and a lower shell component (101).

It should be noted that although this embodiment of the present invention comprises a two-piece shell enclosure, other embodiments of the present invention provide other enclosures for housing oxygen absorbent material. These embodiments can include a single-piece shell enclosure, a single-piece shell enclosure with a lid, a plurality of shell components, a sealable bag, and all functional equivalents. An object of the present invention is to provide an enclosure for housing an oxygen-absorbing material.

The two-piece shell enclosure houses a replaceable sachet that contains an oxygen-absorbing material. The upper shell component (100) and lower shell component (101) can be separated so that a user can gain access to the interior and the replaceable sachet. The upper shell component (100) and lower shell component (101) can be easily separated by hand-pulling them apart.

In some embodiments of the present invention, the lower shell component (101) bears a manufacturer's mark (105) that can denote the trade name of the device or manufacturer.

In some embodiments of the present invention, the upper shell component (100) bears a manufacturer's mark (106) that can denote the type of degradable substance that the assembly is intended to be used with, or can be the manufacturer's trademark.

The upper shell component (100) and lower shell component (101) house a replaceable sachet that contains an oxygen absorbent material. Many commercially available oxygen absorbent materials can be used in the sachet. A wide variety of replaceable food-rated oxygen absorbent sachets exist that easily fit within the shell components (100), (101) of the present invention. Some embodiments of the present invention may use sachets containing oxygen absorbent materials such as reduced iron or salt that, when exposed to oxygen, produces $FeO_2$, more commonly referred to as rust. The sachet can, in some embodiments, also contain accelerants that enhance the oxygen removal properties of the oxygen absorbent material such as mild acids or vitamin C.

Furthermore, it should be noted that the oxygen absorbent material can be housed non-sachet containers such as capsules or dongles. A wide variety of oxygen absorbent materials can be used within the shell components (100), (101) and are intended to be included within the scope of the present invention.

The lower shell component (101) is attached to a stopper neck (104) around which a plurality of sealant rings (103) are disposed. The stopper neck (104) is inserted into containers that contain degradable substances that are to be preserved.

The stopper neck (104) has an opening (107) through which air from the container of a degradable substance flows when the assembly is in use. The stopper neck (104) is hollow so that air may pass from the degradable substance container and into the interior of the assembly. Once air has passed into the interior of the assembly, it comes in contact with the replaceable sachet.

The stopper neck (104) extends into the lower shell component (101) so that dirt, debris, or other material does not fall from the interior of the shell into the degradable substance container. The portion of the stopper neck (104) that extends into the lower shell (101) serves as a physical barrier to prevent any material that has collected in the assembly, or any material residing on the replaceable sachet, from contaminating the degradable substance that is being preserved. Furthermore, the portion of the stopper neck (104) that extends into the lower shell (104) can serve as a contact area to help brace the sachet and keep it in a proper position.

When in use, the primary mechanisms for moving air throughout the assembly, degradable beverage container, and over the replaceable sachet so that the substance in the replaceable sachet can remove oxygen are diffusion and a mild vacuum. One or more of the stopper rings (103) create a seal between the stopper neck (104) and the container of a degradable substance when the assembly is inserted into the container. The stopper rings (103) prevent outside air from inadvertently entering into the invention or the container. The stopper rings (103) are made of a rubber compound, silicone, or other material that is capable of forming and maintaining a seal between the stopper neck (104) and a degradable substance container.

Figure 6:
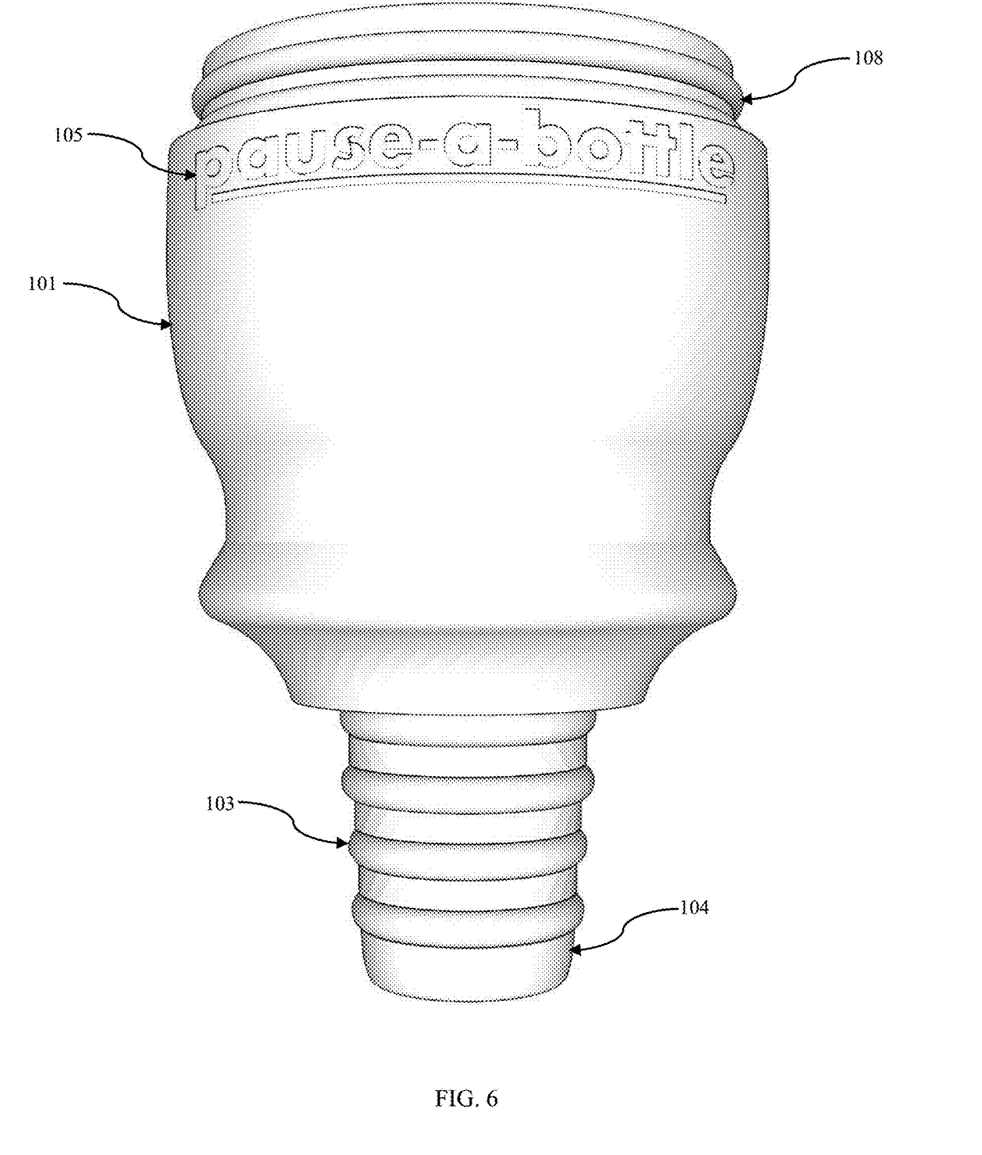
FIG. 6 shows a front view of a lower shell component and stopper neck of a degradable substance preservation device as according to one embodiment of the present invention.
Figure 7:
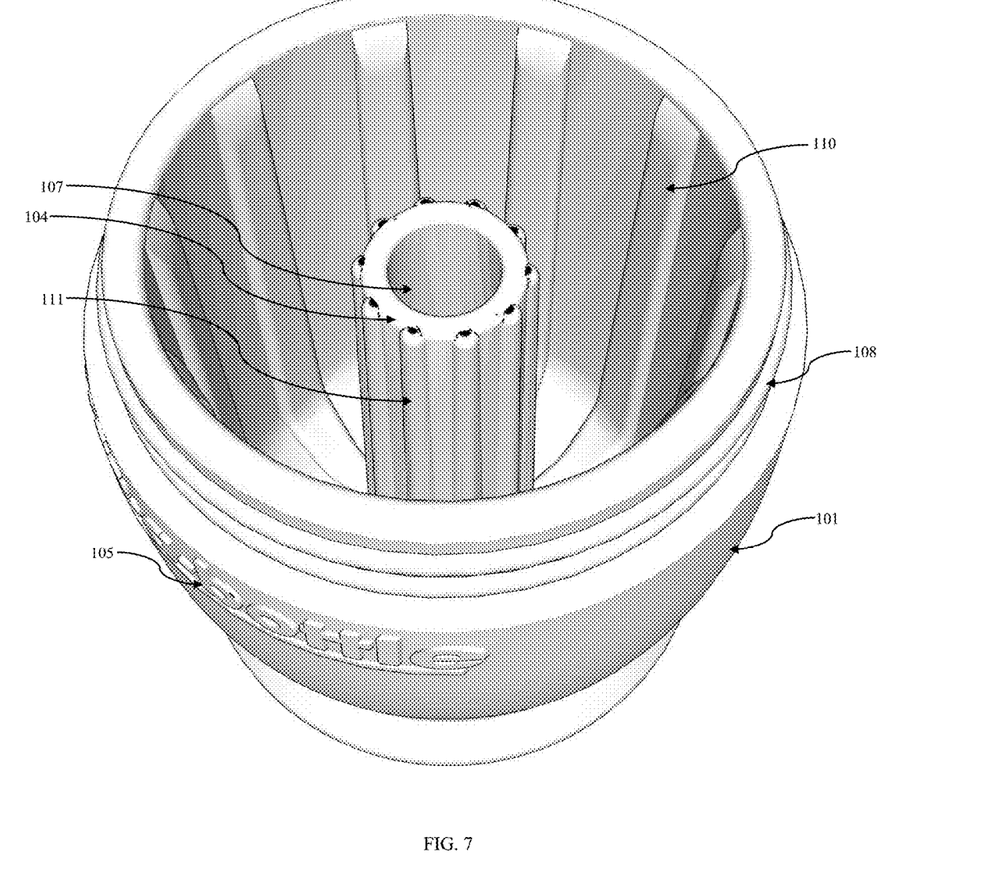
FIG. 7 shows an elevated isometric view of a lower shell component and stopper neck of a degradable substance preservation device as according to one embodiment of the present invention.
Figure 8:
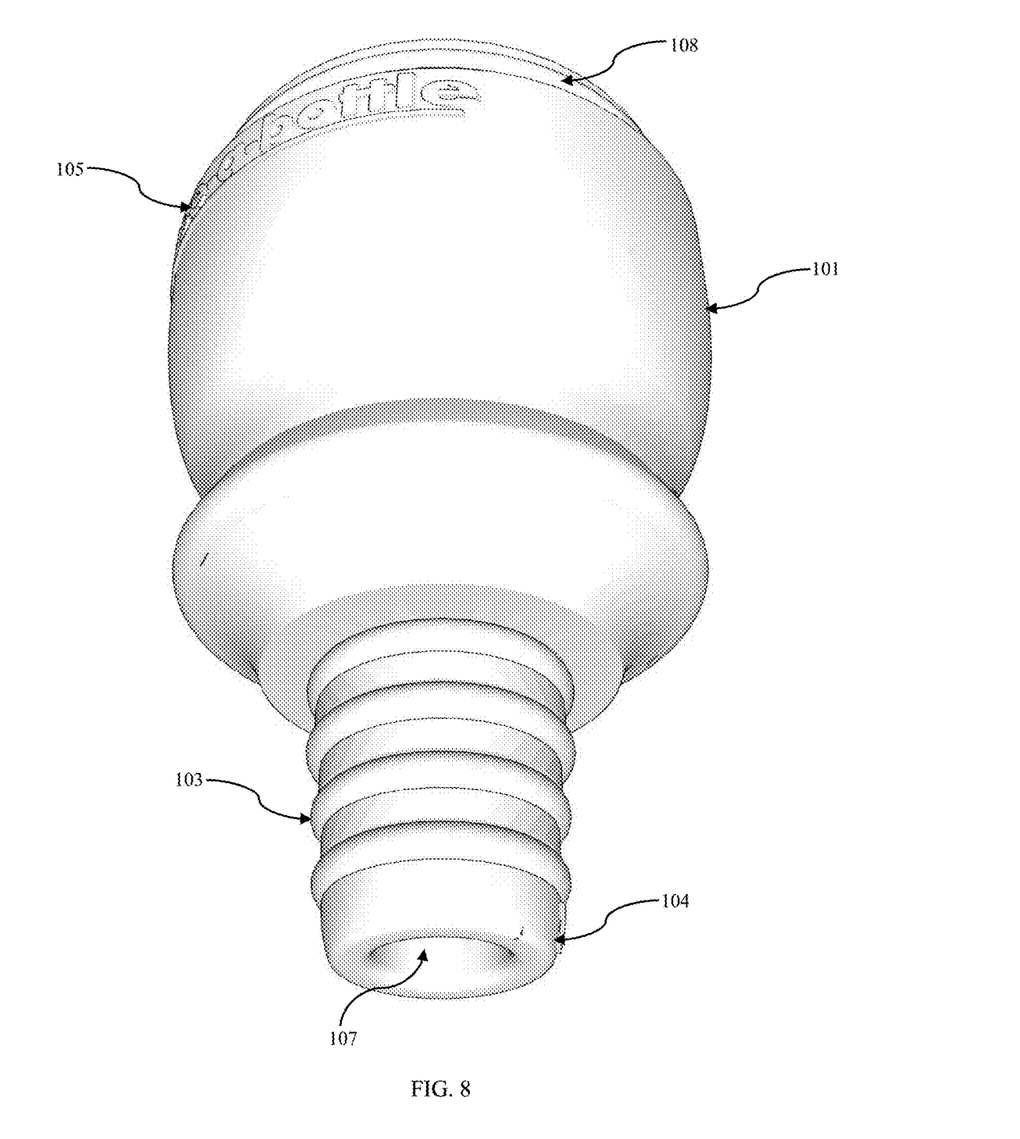
FIG. 8 shows a lower isometric view of a lower shell component and stopper neck of a degradable substance preservation device as according to one embodiment of the present invention.
Figure 9:
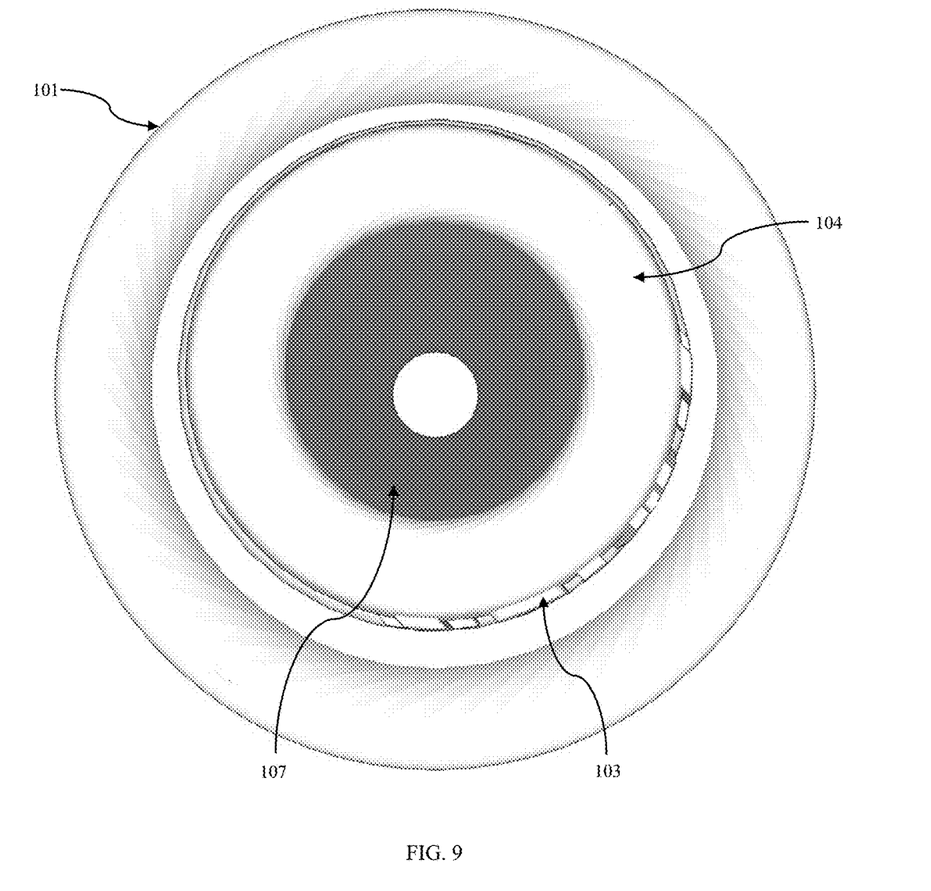
FIG. 9 shows a bottom view of a lower shell component and stopper neck of a degradable substance preservation device as according to one embodiment of the present invention.
Figure 10:
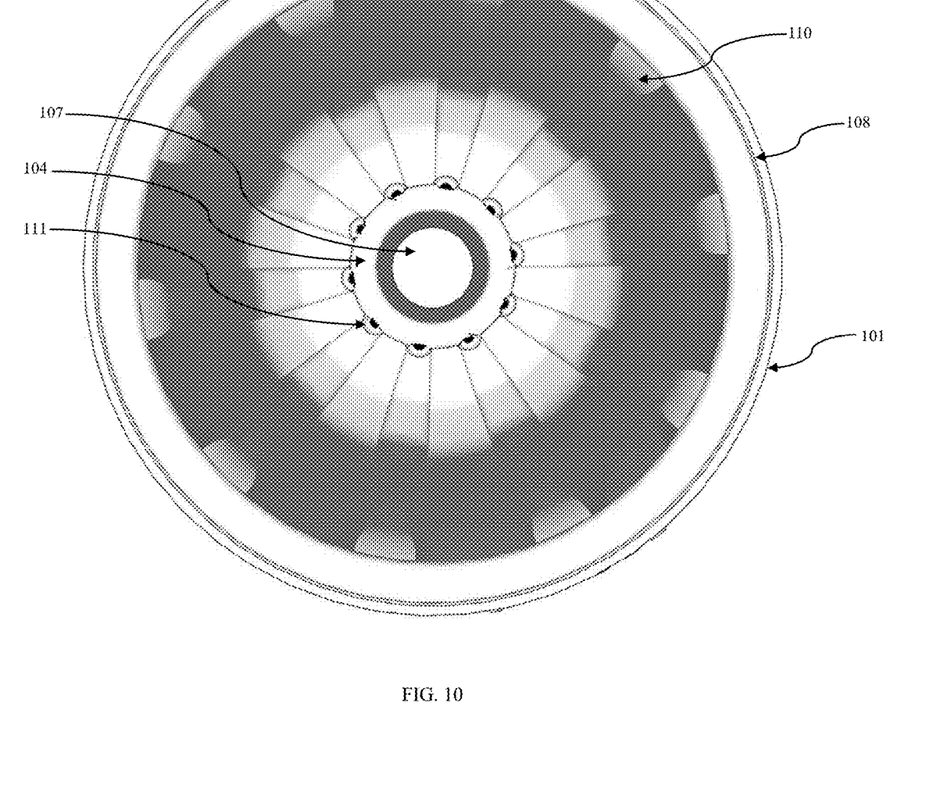
FIG. 10 shows a top view of a lower shell component and stopper neck of a degradable substance preservation device as according to one embodiment of the present invention.

Referring now to FIGS. 6-10 that will be discussed together, there are shown views of a lower shell component (101) of a degradable substance preservation device as according to one embodiment of the present invention. The lower shell component (101) is fitted together with the upper shell component (FIGS. 1-5 (100)) when the invention is in use. When fitted together, a shell ring (108) creates an airtight barrier between the lower shell component (100) and upper shell component (101) to prevent oxygen-rich ambient air from inadvertently penetrating the interior of the assembly. The shell ring (108) can be made a rubber compound, silicone, or other material that is capable of forming and maintaining a seal between the upper shell component (100) and lower shell component (101).

The lower shell component (101) has raised ribs (110) that keep the replaceable sachet containing an oxygen absorbent material elevated from the interior wall of the lower shell component (101). By elevating the sachet from the interior wall of the lower shell component (101), airflow around the sachet is increased thereby enhancing the oxygen-scrubbing ability of the material within the sachet.

The stopper neck (104) extends into the lower shell component (101) so that air from the degradable substance container flows when the invention is in use. The stopper neck (104) has an opening (107) so that air may pass from the degradable substance container and into the interior of the lower shell component (101) and upper shell component (100) when the invention is in use. The portion of the stopper neck (104) that extends into the lower shell component (101) also has raised ribs (111) that keep the replaceable oxygen absorbent material sachet elevated away from the stopper neck (104) so that airflow around the sachet is increased and the oxygen-removing abilities of the material is enhanced.

In addition, the stopper neck (104) extends into the lower shell component (101) so that dirt, debris, or other foreign material that may be present in the assembly does not fall into the degradable substance container. The portion of the stopper neck (104) that extends into the lower shell component (101) serves as a physical barrier to prevent any foreign material that has collected in the lower shell component (101), or any material residing on the sachet, from contaminating the degradable substance that is being preserved. Furthermore, the portion of the stopper neck (104) that extends into the lower shell component (101) can serve as a contact area to help brace the sachet and keep it in a proper position.

Figure 11:
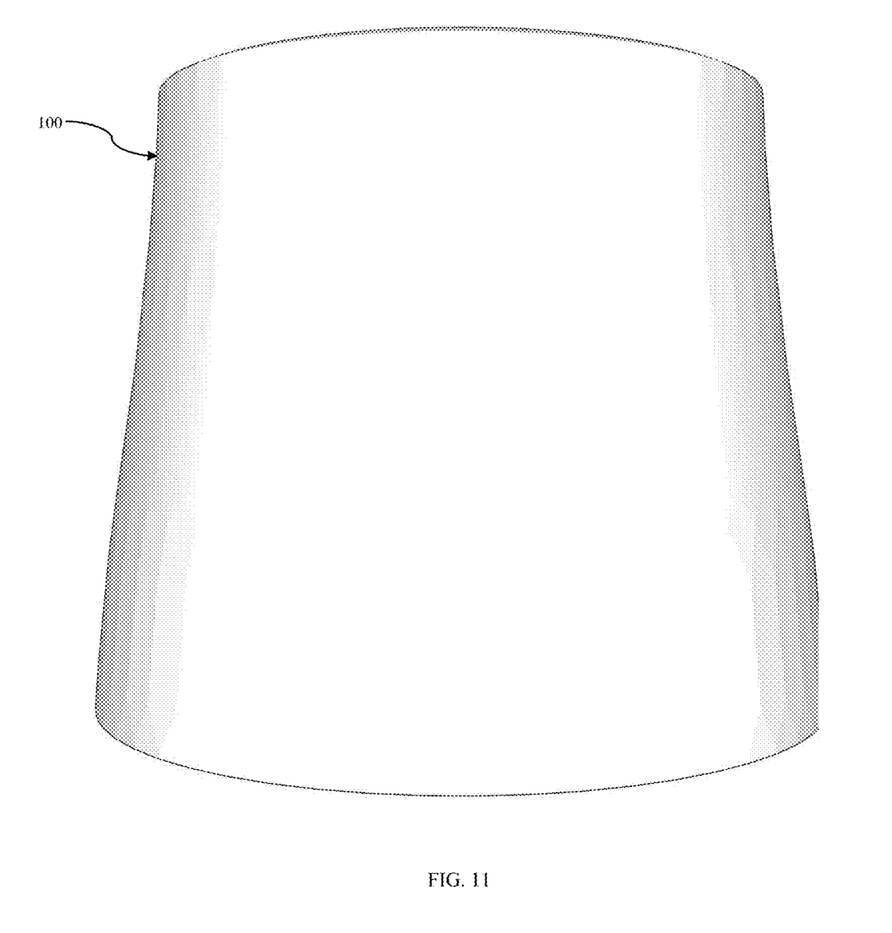
FIG. 11 shows a front view of an upper shell component of a degradable substance preservation device as according to one embodiment of the present invention.
Figure 12:
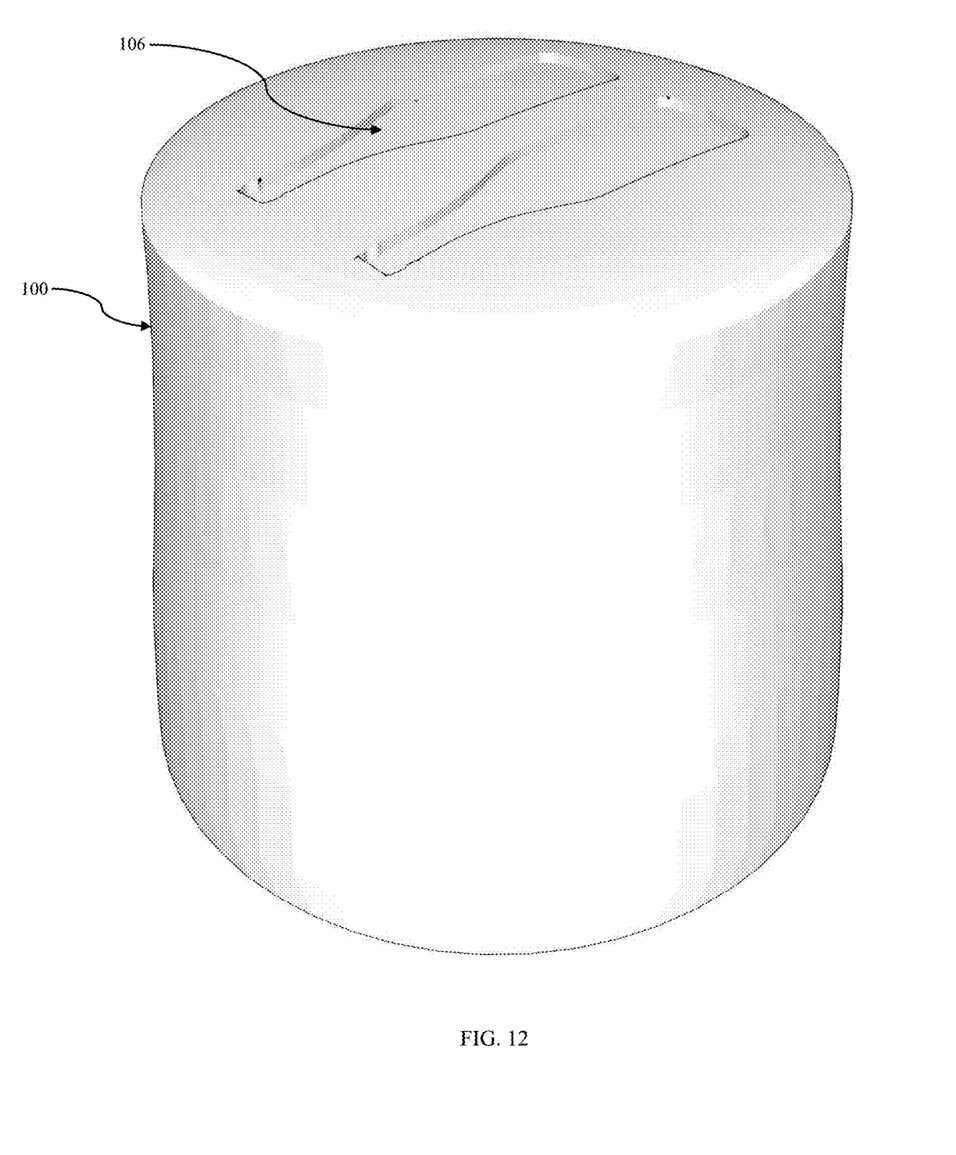
FIG. 12 shows an elevated isometric view of an upper shell component of a degradable substance preservation device as according to one embodiment of the present invention.
Figure 13:
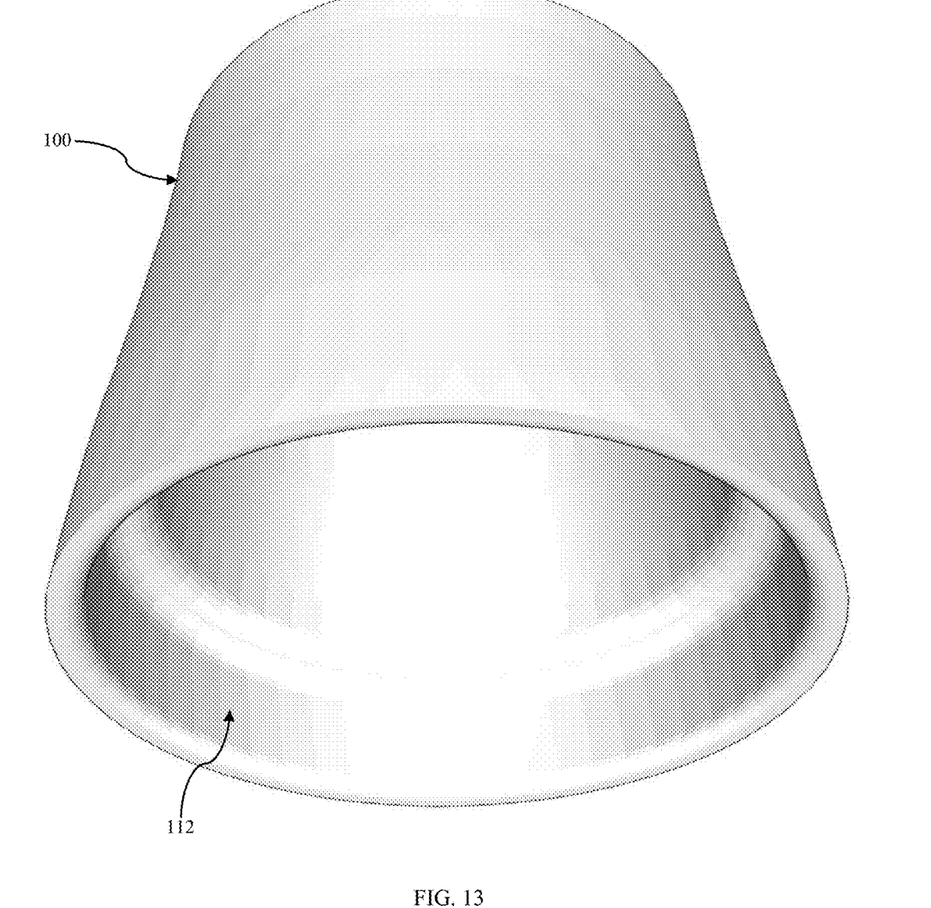
FIG. 13 shows a lower isometric view of an upper shell component of a degradable substance preservation device as according to one embodiment of the present invention.
Figure 14:
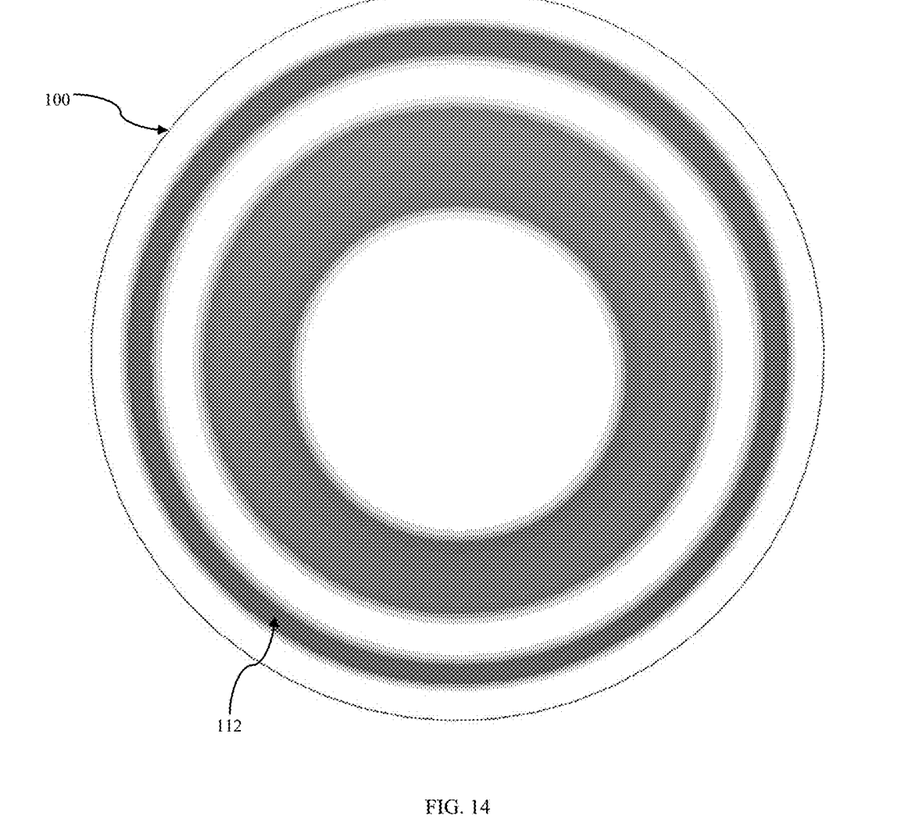
FIG. 14 shows a bottom view of an upper shell component of a degradable substance preservation device as according to one embodiment of the present invention.

Referring now to FIGS. 11-14 that will be discussed together, there are shown views of an upper shell component (100) of a degradable substance preservation device as according to one embodiment of the present invention. The upper shell component (100) has in inner mating surface (112) where the shell ring (FIGS. 6-8, 10 (108)) contacts the upper shell component (100) to form an airtight seal between the upper shell component (100) and lower shell component (101). Friction between the shell ring (FIGS. 6-8, 10 (108)) and upper shell component (100) hold the upper shell component (100) and lower shell component (101) together. A mild vacuum is created within the assembly as oxygen is removed. This mild vacuum also serves to secure the upper shell component (100) and lower shell component (101) together.

The above detailed description sets forth rather broadly the more important features of the present invention in order that its contributions to the art may be better appreciated.

As such, those skilled in the art will appreciate that the conception, upon which disclosure is based, may readily be utilized as a basis for designing other structures, methods, and systems for carrying out the several purposes of the present invention. It is important, therefore, that this description be regarded as including such equivalent constructions insofar as they do not depart from the spirit and scope of the present invention.

Although certain example methods, apparatus and articles of manufacture have been described herein, the scope of coverage of this utility patent application is not limited thereto. On the contrary, this utility patent application covers all methods, apparatus and articles of manufacture fairly falling within the scope of the invention either literally or under the doctrine of equivalents.

To the extent the above specification describes example components and functions with reference to particular compliance requirements, standards and/or protocols, it is understood that the teachings of this disclosure are not limited to such compliance requirements, standards and/or protocols. Such compliance requirements, standards and/or protocols are periodically superseded or revised by newer versions. Accordingly, replacement compliance requirements, standards and/or protocols having the same general functions are equivalents which are intended to be included within the scope of this description.

Directional terms such as "front", "forward", "back", "rear", "in", "out", "downward", "upper", "lower", "top", "bottom", and the like may have been used in the description. These terms are applicable to the embodiments shown and described herein. These terms are merely used for the purpose of description and do not necessarily apply to the position in which components or items within the present invention may be used.

Therefore, the foregoing is considered as illustrative only of the principles of a degradable substance preservation device. Further, since numerous modifications and changes will readily occur to those skilled in the art, it is not desired to limit the preservation device to the exact construction and operation described, and accordingly, all suitable modifications and equivalents may be resorted to, falling within the scope present invention. While the above description describes various embodiments of the present invention, it will be clear that the present invention may be otherwise easily adapted to fit any configuration where using a degradable substance preservation device is desired or required.

As various changes could be made in the above constructions without departing from the scope of the invention, it is intended that all matter contained in the above description shall be interpreted as illustrative and not in a limiting sense.

I claim:

1. An apparatus comprising:
   an upper shell component, a lower shell component, a hollow stopper neck, a stopper ring disposed around the stopper neck, and a shell ring; wherein the shell ring resides between the upper shell component and lower shell component and creates an airtight seal when the upper shell component and lower shell component are fitted together; the upper shell component and lower shell component fitting together to form an assembly within which a replaceable sachet that contains an oxygen absorbent material is housed; the lower shell component being attached to the hollow stopper neck; the hollow stopper neck having an opening through which air from a container containing a degradable substance flows; and the stopper ring disposed around the stopper neck creating an airtight seal between the stopper neck and a container containing the degradable substance when the apparatus is inserted into the container containing the degradable substance, wherein the airtight seal between the upper shell component and lower shell component allow a mild vacuum to be created within the apparatus as oxygen is removed by the oxygen absorbent material within the replaceable sachet, and wherein the lower shell component has raised ribs that keep the replaceable sachet elevated from the interior wall of the lower shell component.

2. The apparatus of claim 1, wherein the upper shell component further comprises an inner mating surface where the shell ring contacts the upper shell component to form the airtight seal when the upper shell component and lower shell component are fitted together.

3. The apparatus of claim 1, wherein the stopper neck extends into the lower shell component and prevents foreign material that has collected in the lower shell component or material residing on the replaceable sachet from contaminating the degradable substance that is being preserved.

4. The apparatus of claim 3, wherein the portion of the stopper neck that extends into the lower shell component has raised ribs that keep the replaceable sachet elevated from the stopper neck.

5. The apparatus of claim 3, wherein the portion of the stopper neck that extends into the lower shell component braces the replaceable sachet and keeps it in a proper position.

6. A degradable substance preservation device comprising:
   a two-piece shell enclosure for housing a replaceable sachet that contains an oxygen absorbent material; the two-piece shell enclosure comprising an upper shell component and a lower shell component; the upper shell component and lower shell component fitting together to form the two-piece shell enclosure; a shell ring residing between the upper shell component and lower shell component when the upper shell component and lower shell component are fit together; the shell ring creating an airtight seal between the upper shell component and the lower shell component when the components are fit together; a stopper neck connected to the lower shell component that allows air from a container containing a degradable substance to pass into the two-piece shell enclosure; and a stopper neck seal that creates an airtight seal between the stopper neck and a container containing a degradable substance when the device is inserted into the container containing the degradable substance, wherein raised ribs within the two-piece shell enclosure elevate the replaceable sachet from the interior of the two-piece shell enclosure, wherein the raised ribs are formed as part of the lower shell component and a portion of the stopper neck that extends into the lower shell component, and wherein the portion of the stopper neck that extends into the lower shell component braces the replaceable sachet so that the replaceable sachet remains in a proper position.

7. The device of claim 6, wherein the upper shell component bears a manufacturer's mark.

8. The device of claim 6, wherein the degradable substance that the device preserves is wine.

9. A method for preserving degradable substances comprising:
   providing an upper shell component and a lower shell component; shaping the upper shell component and lower shell component so that they fit together to form an enclosure to house a replaceable sachet containing an oxygen absorbent material; shaping the upper shell component and lower shell component so that they may be separated by hand; providing a first seal located between the upper shell component and lower shell component when the components are fitted together that creates an airtight seal; providing a hollow stopper neck that allows air to flow from a container containing a degradable substance into the enclosure formed by the upper shell component and lower shell component when they are fitted together; and providing a second seal that resides between the stopper neck and a container containing the degradable substance that creates an airtight seal when the stopper neck is inserted into the container containing the degradable substance, further comprising extending the stopper neck into the lower shell component and shaping the stopper neck so that it prevents foreign material that has collected in the lower shell component or material residing on the replaceable sachet from contaminating the degradable substance that is being preserved, and further comprising providing raised ribs on the lower shell component that elevate the replaceable sachet from the interior of the lower shell component.

10. The method of claim 9, further comprising providing raised ribs on the portion of the stopper neck that extends into the lower shell component that elevate the replaceable sachet from the stopper neck.

11. The method of claim 9, further comprising providing a manufacturer's mark on the upper shell component.

12. The method of claim 9, further comprising shaping the stopper neck so that it fits into the neck of a wine bottle.

13. The method of claim 9, further comprising manufacturing the first seal or the second seal from a rubber compound or silicone.

\* \* \* \* \*